US009348806B2

(12) United States Patent
Clarkson et al.

(10) Patent No.: US 9,348,806 B2
(45) Date of Patent: May 24, 2016

(54) HIGH SPEED DICTIONARY EXPANSION

(71) Applicant: INTERNATIONAL BUSINESS MACHINES CORPORATION, Armonk, NY (US)

(72) Inventors: Kenneth L. Clarkson, Madison, NJ (US); Daniel F. Gruhl, San Jose, CA (US); Neal R. Lewis, San Jose, CA (US); Nimrod Megiddo, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/502,939

(22) Filed: Sep. 30, 2014

(65) Prior Publication Data

US 2016/0092435 A1 Mar. 31, 2016

(51) Int. Cl.
*G06F 17/21* (2006.01)
*G06F 17/27* (2006.01)
*G06F 17/30* (2006.01)

(52) U.S. Cl.
CPC .......... *G06F 17/2735* (2013.01); *G06F 17/277* (2013.01); *G06F 17/30731* (2013.01); *G06F 17/30734* (2013.01); *G06F 17/30737* (2013.01)

(58) Field of Classification Search
CPC ............ G06F 17/2785; G06F 17/2735; G06F 17/2765; G06F 17/277; G06F 17/2775; G06F 17/278; G06F 17/30731; G06F 17/30734; G06F 17/30737
See application file for complete search history.

(56) References Cited

U.S. PATENT DOCUMENTS

| | | | | |
|---|---|---|---|---|
| 7,308,464 | B2 * | 12/2007 | Nowitz | G06F 17/30038 |
| 7,558,778 | B2 | 7/2009 | Carus et al. | |
| 7,840,592 | B2 * | 11/2010 | Muras | G06F 17/30587 707/769 |
| 8,543,374 | B2 * | 9/2013 | Dymetman | G06F 17/2775 704/2 |
| 2005/0004935 | A1 * | 1/2005 | Thede | G06F 17/30911 |
| 2005/0108630 | A1 * | 5/2005 | Wasson | G06F 17/241 715/230 |
| 2006/0277465 | A1 * | 12/2006 | Pandit | G06F 17/277 715/234 |
| 2007/0073534 | A1 * | 3/2007 | Guo | G06F 17/30731 704/9 |
| 2008/0228769 | A1 | 9/2008 | Lita et al. | |
| 2008/0301121 | A1 * | 12/2008 | Suzuki | G06F 17/30734 |
| 2010/0114879 | A1 * | 5/2010 | Zhong | G06F 17/278 707/723 |
| 2012/0158703 | A1 * | 6/2012 | Li | G06F 17/30693 707/723 |
| 2013/0073571 | A1 | 3/2013 | Coulet et al. | |

(Continued)

OTHER PUBLICATIONS

Ye, Min, "Text Mining for Building a Biomedical Knowledge Base on Diseases, Risk Factors, and Symptoms," Master's Thesis, Databases and Information Systems Max-Planck-Institute for Informatics Saarbrucken, Germany, Mar. 31, 2011, 72 pages.

(Continued)

*Primary Examiner* — Richard Zhu
(74) *Attorney, Agent, or Firm* — Stephen Kenny; Erik Huestis; Foley Hoag LLP

(57) ABSTRACT

Embodiments of the present invention relate to a pattern-based system for building dictionaries of terms related to a seed set of terms. In one embodiment, a text is read. The text comprises a plurality of tokens. A first plurality of patterns is read. The first plurality of tokens is searched using the first plurality of patterns to generate a plurality of candidate terms. Each of the plurality of candidate term comprises one or more of the plurality of tokens. A plurality of seed terms is read. Each of the first plurality of patterns is scored based on the plurality of candidate terms and the plurality of seed terms.

20 Claims, 5 Drawing Sheets

(56) References Cited

U.S. PATENT DOCUMENTS

| | | |
|---|---|---|
| 2013/0238607 A1 | 9/2013 | Yao et al. |
| 2013/0262086 A1 | 10/2013 | Kim et al. |
| 2015/0073798 A1* | 3/2015 | Karov ............... G10L 15/197 704/245 |
| 2015/0227626 A1* | 8/2015 | Mahapatra ........ G06F 17/30864 707/706 |

OTHER PUBLICATIONS

Liu, Ting et al., "Bootstrapping Events and Relations from Text," Proceedings of the 13th Conference of the European Chapter of the Association for Computational Linguistics, pp. 296-305, Association for Computational Linguistics, 2012.-305.

de Pablo-Sanchez, César, et al., "Lightly Supervised Acquisition of Named Entities and Linguistic Patterns for Multilingual Text Mining," Knowledge and Information Systems, 2013, pp. 1-23.

Xu, Yan et al., "Feature Engineering Combined with Machine Learning and Rule-Based Methods for Structured Information Extraction from Narrative Clinical Discharge Summaries," Journal of the American Medical Informatics Association 19, No. 5, 2012, pp. 824-832.

Patil, Sangameshwar et al., "Named Entity Extraction Using Information Distance," International Joint Conference on Natural Language Processing, pp. 1264-1270, Nagoya, Japan, Oct. 14-18, 2013.

* cited by examiner

HIGH SPEED DICTIONARY EXPANSION

BACKGROUND

Embodiments of the present invention relate to dictionary expansion, and more specifically, to a pattern-based system for building dictionaries of terms related to a seed set of terms.

BRIEF SUMMARY

According to one embodiment of the present invention, a method of and computer program product for dictionary expansion are provided. A text is read. The text comprises a plurality of tokens. A first plurality of patterns is read. The first plurality of tokens is searched using the first plurality of patterns to generate a plurality of candidate terms. Each of the plurality of candidate term comprises one or more of the plurality of tokens. A plurality of seed terms is read. Each of the first plurality of patterns is scored based on the plurality of candidate terms and the plurality of seed terms.

DETAILED DESCRIPTION

Figure 1:
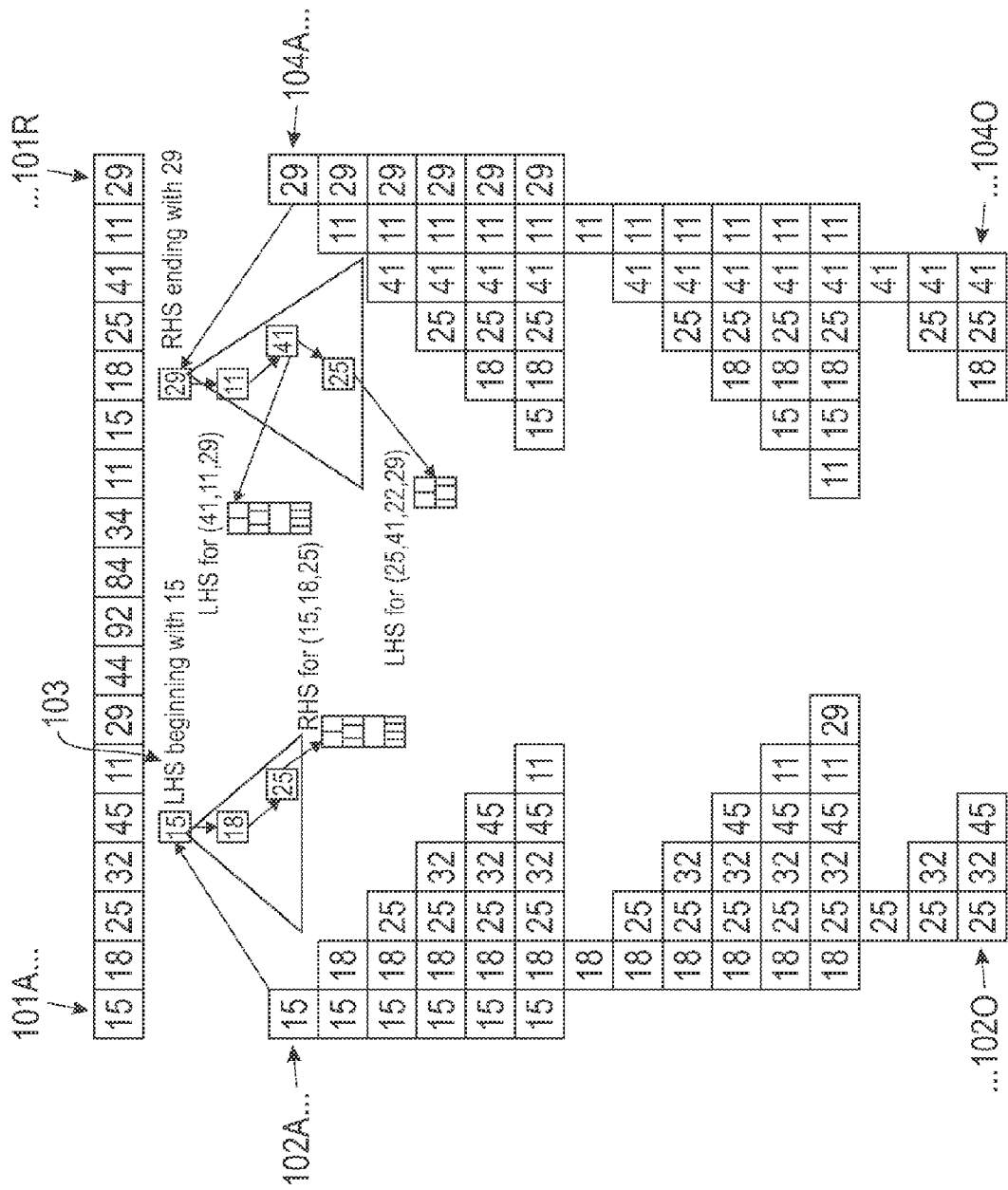
FIG. 1 depicts exemplary input and exemplary pattern trees according to embodiments of the present disclosure.

The problem of developing and maintaining a set of terms and phrases that represent an entity class (a dictionary) is central to the processing of natural languages by computers. For example, in processing medical records it is important to know whether a term refers to a pharmaceutical. This determination may be made by looking the term up in a dictionary of pharmaceutical terms. Such dictionaries may include several thousand terms. Thus, building such dictionaries may be very expensive.

A top-down (expert- or committee-driven) approach may be used to construct sets of terms for dictionaries. However, this approach is poorly suited for certain domains and subject matter. For example, medical records may include extensive misspellings, abbreviations, locale specific terms, as well as rapidly changing and growing domains.

Humans are well suited to such challenging domains. They look to the context around a word to try and understand what class of things a word refers to. Various algorithmic approaches may be adopted to analyze context to determine an entity class. However, prior approaches, both algorithmic and expert-driven, are slow. If a dictionary extraction requires repeated cycles of review by subject matter experts, then to be efficient, the extraction should take no more than a few minutes, rather than the hours or days that an extensive pattern-extraction run in other approaches would take.

One disadvantage to relying exclusively on expert input is that although an expert is likely to be able to recognize a member of a set when they see it, they may not be able to list every example without context. For example, listing all comedy movies would be highly challenging, although an expert would be likely to recognize one after seeing its name.

According to embodiments of the present disclosure, concepts in text are identified based on patterns that approximately surround them in the text. A set of patterns is iteratively expanded starting from a seed collection of terms. Each iteration combines computer search and subject-matter-expert opinion.

The need to develop new dictionaries is one of the key inhibitors to bringing analytics to a new domain. Techniques that can reduce the time taken to develop (and maintain) such dictionaries from days and weeks to hours and minutes can significantly accelerate the ability of software and services to pursue new industry verticals.

An algorithm according to various embodiments of the present disclosure starts with a set of one or more seed terms for a dictionary. For example, a seed set of over the counter pharmaceutical names might be: {"Aspirin", "Paracetamol", "Ibuprofen"}.

One or more corpus of text is analyzed to locate instances of dictionary terms. For example, the phrase "told the patient to take Aspirin for his headache" might be found when searching using the above referenced example seed set. In some embodiments, all instances in the corpora are located, while in other embodiments, only some occurrences are located. In some embodiments, a predetermined number of occurrences are located. In some embodiments, a proportion of occurrences are located, such as for example by sampling only a random subset of each corpus. In some embodiments, a search of the corpora of data is performed using a text search algorithm known in the art.

For each occurrence of a dictionary term in a corpus, potential patterns are created. The potential patterns may comprise a predetermined number of additional terms to the left and to the right of the occurrence of the search term. In some embodiments, the number of additional terms is from zero to six. For example, an exemplary pattern with one term to the left and two terms to the right drawn from the above-referenced example phrase is "take _____ for his". In some embodiments, multiple potential patterns are created, covering combinations of left and right term counts within a range. For example, patterns may be determined having each combination of from zero to six terms to the left and from zero to six terms to the right. This would yield 7*7=48 potential patterns (exclusive of the 0-0 pattern).

Each of the potential patterns is applied to the corpus to determine additional terms that may fall within that pattern. For example, applying the pattern "take _____ for his" to a corpus of data might return {"Diphenhydramine", "Ibuprofen", "cash"}. In some embodiments, the potential patterns are applied to the entire corpus. In some embodiments, the potential patterns are applied to a subset of the corpus.

For each potential pattern, the set of terms that fall within the pattern is analyzed. The cardinality of the set of terms is determined, and is referred to herein as the support for the pattern. In the above example, the set of terms has cardinality 3, so the support is also 3. The fraction of those terms that occur in the seed set is referred to herein as the confidence. In the above example, only the term "Ibuprofen" appears in the seed set, and so the confidence is ⅓. As will be appreciated from this example, in some embodiments capitalization is preserved, while in some embodiments it is not. In certain fields, capitalization matters to meaning (e.g., a bush is a plant, while a Bush is a person).

Those potential patterns with support above a lower limit and with confidence above a lower limit are considered. In some embodiments, the lower limits on support and confidence are predetermined values. The number of potential patterns in which a given term appears is denoted the prevalence of that term. For example, with a lower limit on confidence of 0.2 and a lower limit on support of 2, there might be 15 patterns in which "Diphenhydramine" appears. Thus, the prevalence of "Diphenhydramine" is 15.

A predetermined number of the top terms by prevalence are taken. These top terms are shown to a subject matter expert. The terms indicated by the subject matter expert to be part of the class of interest are added to the dictionary. After supplementing the dictionary, the above steps are repeated, beginning by locating instances of terms in the expanded dictionary.

As will be appreciated from the above, a substantial contributor to the runtime of the dictionary expansion algorithm is the application of many patterns to large corpora of text. To provide an efficient implementation of this process, some embodiments of the present disclosure use the Glimpse algorithm.

Referring now to FIG. 1, the Glimpse algorithm encodes words as integers 101A . . . 101R. Thus, the patterns and the corpus of data are encoded as arrays of integers. A sequence of 18 words is depicted in FIG. 1. However, in alternative embodiments, longer or shorter arrays of words are considered. In some embodiments, each potential pattern is encoded in a data structure comprising a plurality of trees. In some embodiments, the trees are stored in Random Access Memory (RAM). Such tree-based structures facilitate rapid search for and insertion of patterns.

In FIG. 1, a plurality of left-hand side (LHS) patterns 102A . . . 102O are depicted. The set of potential LHS patterns In embodiments in which potential patterns are stored in trees, each row 102A . . . 102O corresponds to a path through a tree. Thus, 102A correspond to a path of length 1 from the root node of tree 103. Tree 103 depicts a path of length 3, comprising words 15, 18, and 25. In various embodiments, alternative data structures may be used to store the LHS elements, e.g., a matrix.

Each LHS pattern is stored with a set of its counterpart RHS patterns. In some embodiments, the LHS patterns are stored in a tree as described above, in which each branch node is in turn linked to a data structure containing right-hand side (RHS) patterns. In some embodiments, the RHS patterns are encoded in a tree. In other embodiments, the RHS patterns are stored in a table. The set of all ordered pairs of LHS and RHS patterns is denoted L. As described below, ordered pairs in L are detected in an input. In some embodiments, the ordered pairs are detected when separated by a maximum number of words. In some embodiments, the maximum separation is 6.

Figures 2A, 2B:
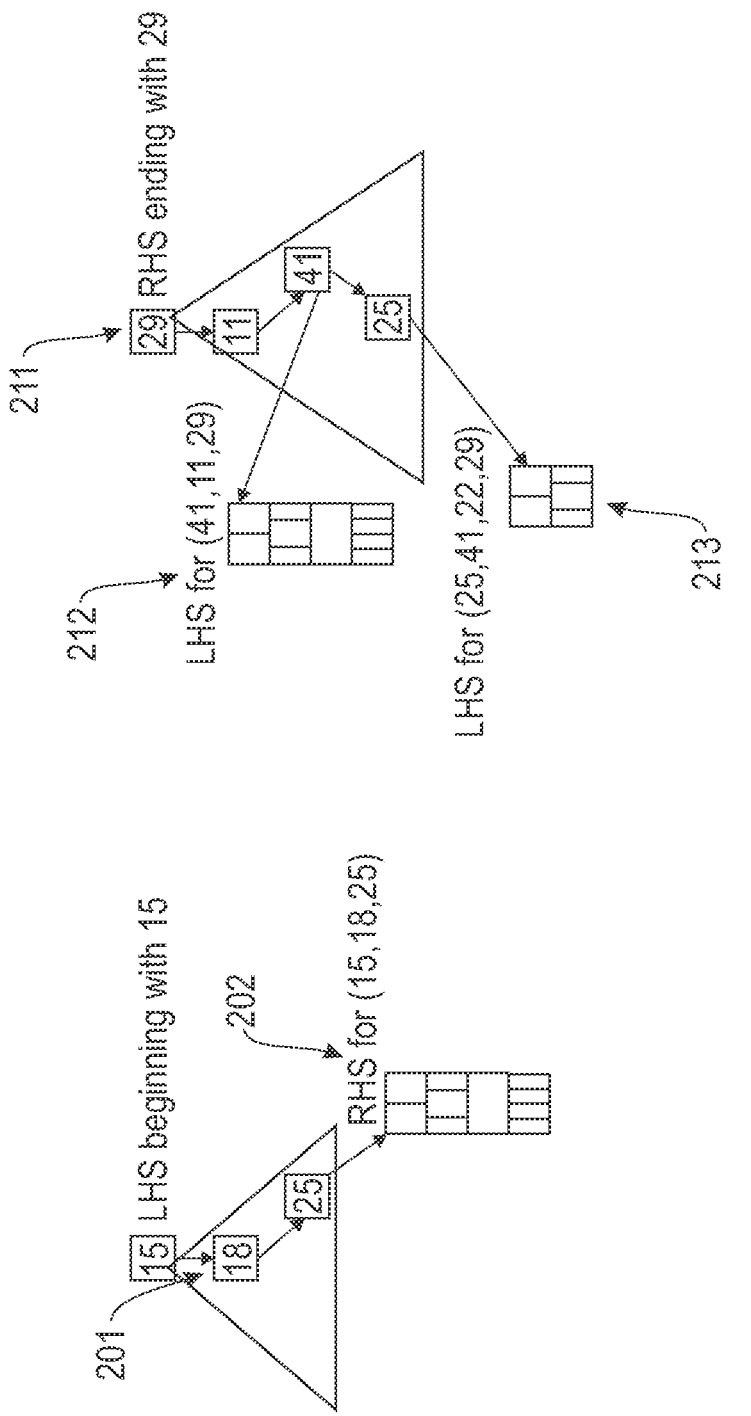
FIGS. 2A-2D depict exemplary pattern data structures according to embodiments of the present disclosure.
Figure 2D:
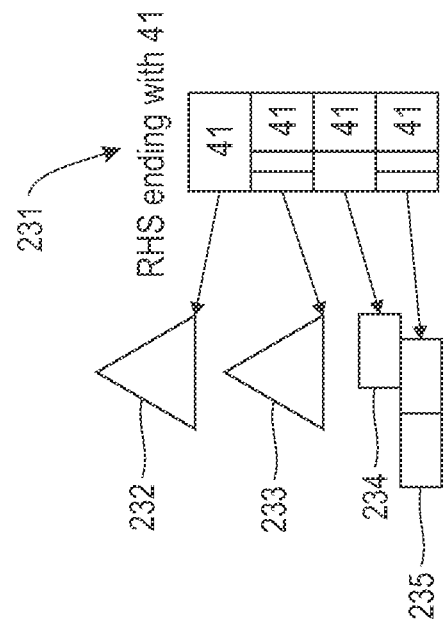
Figure 2C:
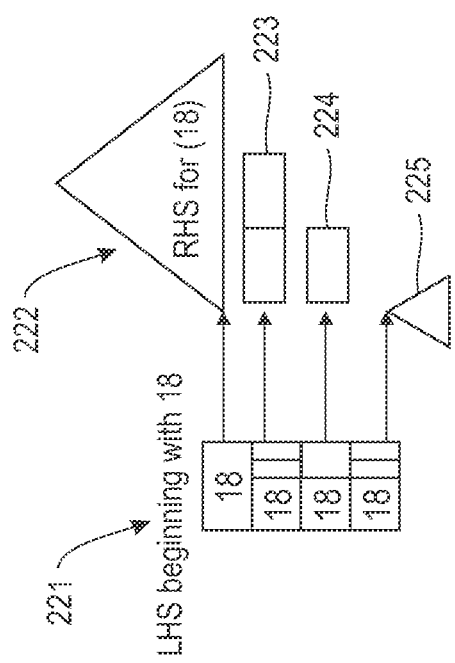

Referring to FIG. 2, exemplary arrangements of data structures according to embodiments of the present disclosure are provided. In FIG. 2A, a tree 201 comprises LHS patterns and includes a link to a table 202 containing corresponding RHS patterns. In FIG. 2B, table 211 comprises RHS patterns and includes links to tables 212, 213 containing corresponding LHS patterns. In FIG. 2C, table 221 comprises LHS patterns and includes links to trees 222, 225 and tables 223, 224 containing corresponding RHS patterns. In FIG. 2D, table 231 comprises RHS patterns and includes links to trees 232, 233 and tables 234, 235 containing corresponding LHS patterns.

As will be appreciated from the schematic of FIG. 1, the LHS patterns are organized by their first word at the first level of the tree, then by the second word, and so on (102A . . . 102O). The RHS patterns are organized by their ultimate word at the first level of the tree, then by the penultimate word, and so on (104A . . . 104O).

An input comprising a sequence S of terms $T_1 \ldots T_n$ is read. In some embodiments, n=18. In some embodiments, the terms are stored in an integer buffer of length n. In such embodiments, the buffer may be a circular linked list and may be updated by dropping $T_1$ in favor of the next word of an input corpus. In other embodiments using a memory map, this is implemented as a moving window. In some such embodiments, the window is of up to 18 tokens.

According to various embodiments, the input sequence S is analyzed to determine whether it contains a LHS patterns and a corresponding RHS pattern. In particular, a sequence S is a match where $T_1 \ldots T_i$ is an LHS pattern, $T_{i+j} \ldots T_{i+j+k}$ is a RHS pattern, and the pair of patterns are contained in the set L. In some embodiments, a length limit is imposed, such that a match is only found where i<7, j<7, k<7.

Based on input sequence S, a search is performed for LHS phrases that match a subsequence $T_1 \ldots T_i$. As noted above, in some embodiments a length limit is imposed, e.g., i<7. This search is performed by walking down the tree of phrases whose first word is $T_1$, seeming to match $T_1 \ldots T_i$. Once a match is found, a search is performed for the RHS counterparts of the LHS pattern.

Figure 3:
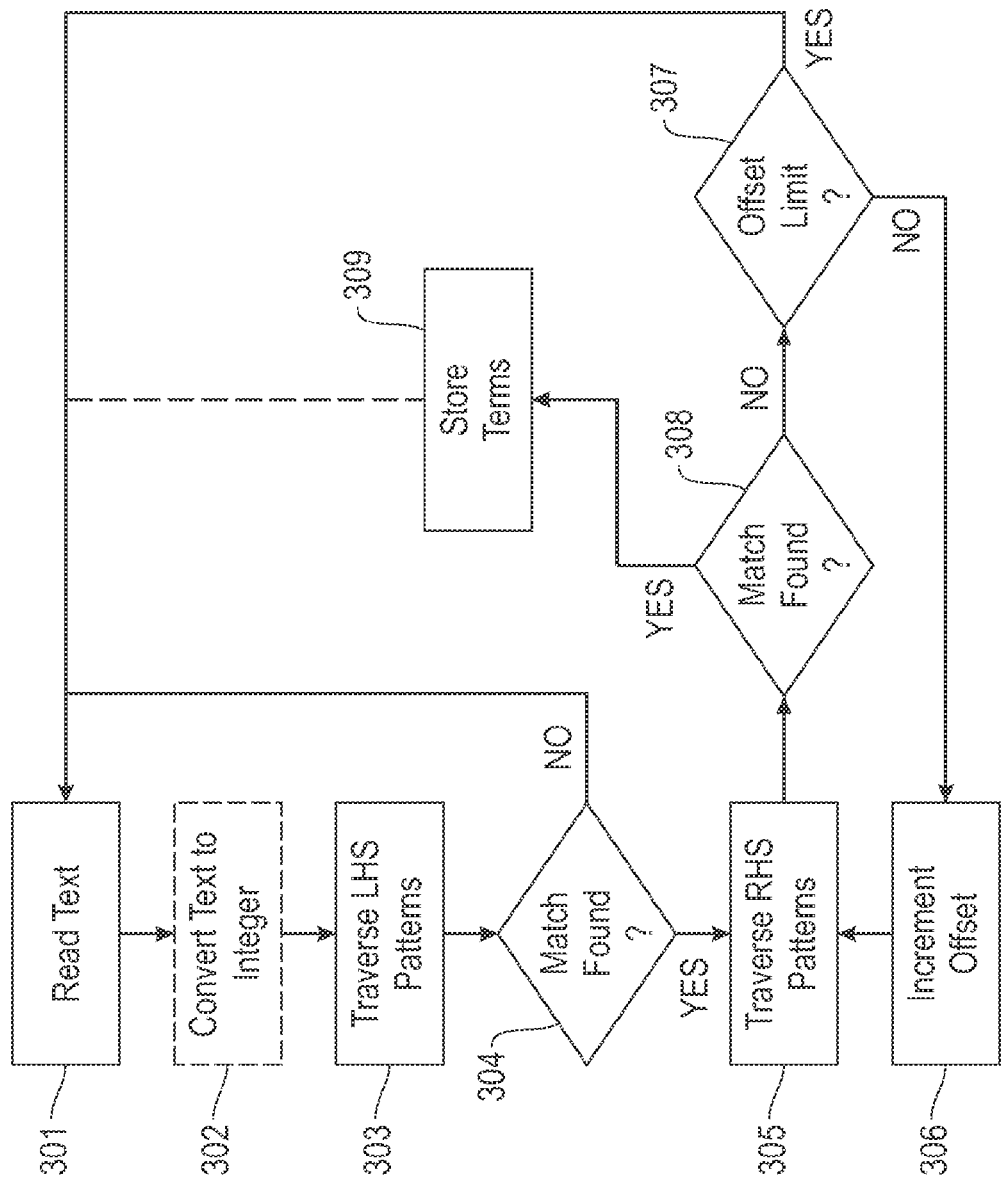
FIG. 3 depicts a method of pattern matching according to embodiments of the present disclosure.

Referring now to FIG. 3, an exemplary method is provided for identifying patterns in an input sequence. A term of an input sequence S is read 301 into memory. In some embodiments, the text is read into a buffer. In some embodiments, the text is converted 302 into an integer encoding. In some embodiments, this conversion is performed using a lookup table of known tokens and associated integer values. In some embodiments, the entire text is converted into an integer encoding in a preprocessing step (not pictured). In such embodiments, the integer encoded text is read without the need for further encoding. The LHS pattern tree is traversed 303 until a match is found 304. In some embodiments, the LHS pattern tree is encoded as a vector of integers. If a LHS pattern match is found, then the corresponding RHS pattern tree is traversed 305 with an initial offset from the matching LHS pattern. In some embodiments, the initial offset is set to 1 (not pictured). For illustration, with an initial offset of 1, a single term of the input is located between the LHS pattern and a potential RHS pattern. The offset is incremented 306, and the RHS tree is traversed 305 again. This process is repeated while the offset is less than a predetermined upper limit 307. In some embodiments, the upper limit is 6. If a match is found 308, the terms between the RHS and LHS patterns are stored 309. In some embodiments, the LHS and RHS patterns are stored with the terms. In other embodiments, identifiers of the LHS and RHS patterns are stored.

In some embodiments, once the first LHS and RHS matches are found, the next term is read. However, in other embodiments, all potential LHS and RHS matches for a given input are found prior to reading the next term.

It will be appreciated from the above description that systems and methods of the present disclosure do not require syntactic information within a phrase to identify if it belongs in an entity class. Thus, the computational expense of syntactic parsing is avoided. Moreover, by avoiding syntactic parsing, potentially inconsistent results are avoided across different domains, such as clinical and academic publications. In addition, the systems and methods of the present disclosure are language independent by virtue of relying on corpora for accuracy and not relying on syntactic information of a corpus.

Figure 4:
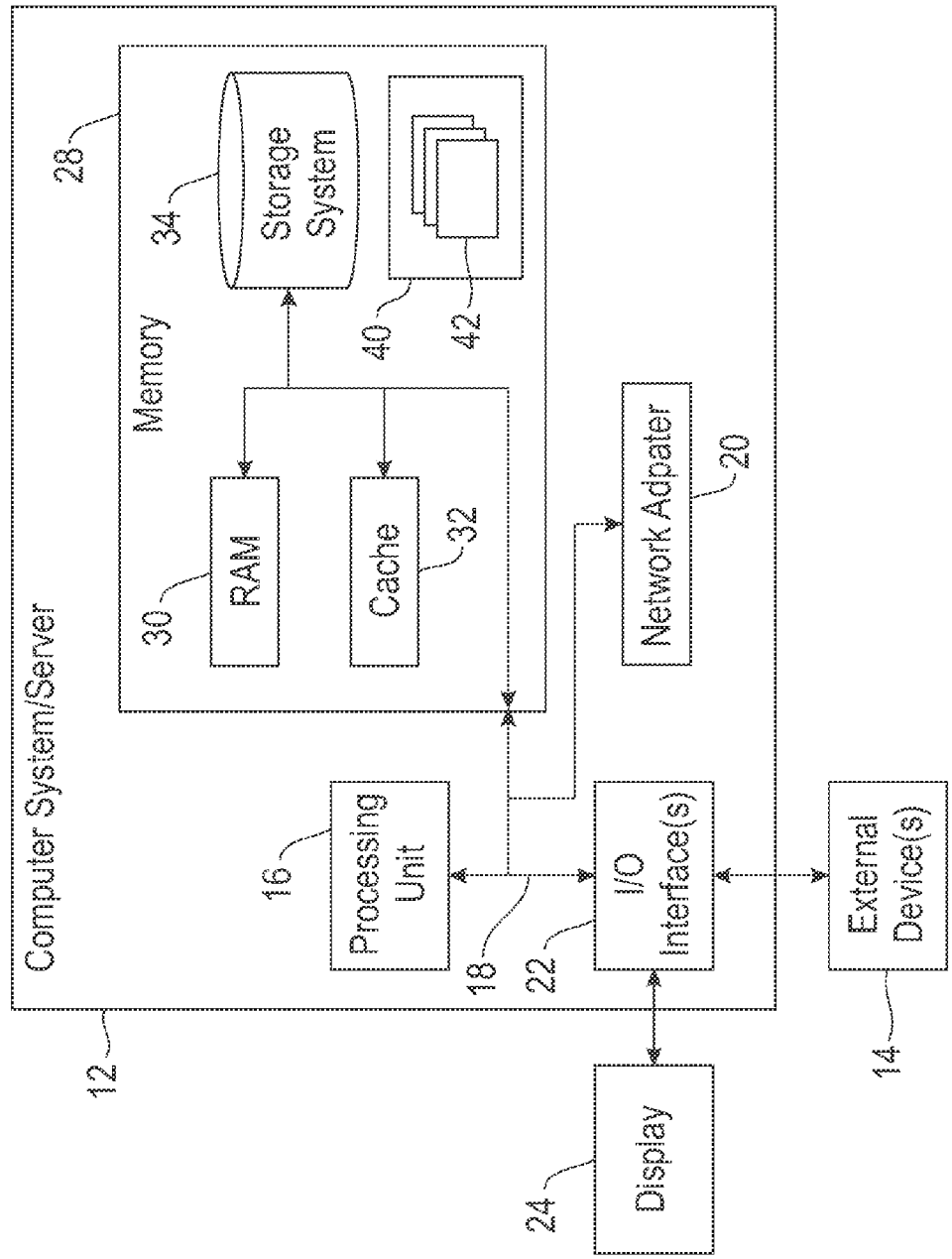
FIG. 4 depicts a computing node according to an embodiment of the present invention.

Referring now to FIG. 4, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a text, the text comprising a plurality of tokens;
reading a first plurality of patterns;
searching the first plurality of tokens using the first plurality of patterns to generate a plurality of candidate terms, each of the plurality of candidate term comprising one or more of the plurality of tokens;
reading a plurality of seed terms;
scoring each of the first plurality of patterns based on the plurality of candidate terms and the plurality of seed terms, scoring each of the first plurality of patterns comprising determining a cardinality of the plurality of candidate terms and determining a fraction of the plurality of candidate terms contained within the plurality of seed terms;
scoring each of the plurality of candidate terms; and
supplementing the plurality of seed terms with a predetermined number of the plurality of candidate terms having the highest score.

2. The method of claim 1, further comprising:
receiving an indication for at least one of the plurality of candidate terms as to its inclusion in a predetermined category.

3. The method of claim 2, wherein the indication is received from a user.

4. The method of claim 2, wherein the indication is based on a heuristic.

5. The method of claim 1, further comprising:
supplementing the plurality of seed terms with one or more of the plurality of candidate terms;
searching a second plurality of tokens using a second plurality of patterns to generate a second plurality of candidate terms; and scoring each of the second plurality of patterns based on the second plurality of candidate terms and the supplemented plurality of seed terms.

6. The method of claim 5, wherein searching the first plurality of tokens comprises traversing the tree structure.

7. The method of claim 1, wherein scoring each of the first plurality of patterns further comprises:
    selecting a subset of patterns of the first plurality of patterns, each pattern of the subset having cardinality above a first predetermined value and fraction above a second predetermined value.

8. The method of claim 1, wherein scoring each of the plurality of candidate terms comprises:
    determining a count of the first plurality of patterns in which each of the plurality of candidate terms appears.

9. The method of claim 1, wherein each token is a word.

10. The method of claim 1, wherein the first plurality of patterns comprises a tree structure.

11. The method of claim 1, wherein reading the text comprises converting each of the plurality of tokens into an integer.

12. The method of claim 1, further comprising:
    determining the first plurality of patterns from the plurality of seed terms.

13. A computer program product for dictionary expansion, the computer program product comprising a computer readable storage medium having program instructions embodied therewith, the program instructions executable by a processor to cause the processor to perform a method comprising:
    reading a text, the text comprising a plurality of tokens;
    reading a first plurality of patterns;
    searching the first plurality of tokens using the first plurality of patterns to generate a plurality of candidate terms, each of the plurality of candidate term comprising one or more of the plurality of tokens;
    reading a plurality of seed terms;
    scoring each of the first plurality of patterns based on the plurality of candidate terms and the plurality of seed terms;
    determining a cardinality of the plurality of candidate terms;
    determining a fraction of the plurality of candidate terms contained within the plurality of seed terms;
    scoring each of the plurality of candidate terms; and
    supplementing the plurality of seed terms with a predetermined number of the plurality of candidate terms having the highest score.

14. The computer program product of claim 13, wherein the method further comprises:
    supplementing the plurality of seed terms with one or more of the plurality of candidate terms;
    searching a second plurality of tokens using a second plurality of patterns to generate a second plurality of candidate terms; and
    scoring each of the second plurality of patterns based on the second plurality of candidate terms and the supplemented plurality of seed terms.

15. The computer program product of claim 13, wherein the method further comprises:
    selecting a subset of patterns of the first plurality of patterns, each pattern of the subset having cardinality above a first predetermined value and fraction above a second predetermined value.

16. The computer program product of claim 13, wherein scoring each of the plurality of candidate terms comprises:
    determining a count of the first plurality of patterns in which each of the plurality of candidate terms appears.

17. The computer program product of claim 13, wherein the method further comprises:
    receiving an indication for at least one of the plurality of candidate terms as to its inclusion in a predetermined category.

18. The computer program product of claim 17, wherein the indication is received from a user.

19. The computer program product of claim 17, wherein the indication is based on a heuristic.

20. The computer program product of claim 17, wherein each token is a word.

* * * * *